(12) United States Patent
Lee et al.

(10) Patent No.: US 10,421,258 B2
(45) Date of Patent: Sep. 24, 2019

(54) MULTILAYER STRUCTURE COMPRISING POLYPROPYLENE

(71) Applicant: E I DU PONT DE NEMOURS AND COMPANY, Wilmington, DE (US)

(72) Inventors: I-Hwa Lee, Wilmington, DE (US); Karlheinz Hausmann, Auvernier (CH)

(73) Assignee: Performance Materials NA, Inc., Midland, MI (US)

( * ) Notice: Subject to any disclaimer, the term of this patent is extended or adjusted under 35 U.S.C. 154(b) by 251 days.

(21) Appl. No.: 15/503,625

(22) PCT Filed: Aug. 13, 2015

(86) PCT No.: PCT/US2015/044956
§ 371 (c)(1),
(2) Date: Feb. 13, 2017

(87) PCT Pub. No.: WO2016/025663
PCT Pub. Date: Feb. 18, 2016

(65) Prior Publication Data
US 2017/0266933 A1    Sep. 21, 2017

Related U.S. Application Data

(60) Provisional application No. 62/036,817, filed on Aug. 13, 2014.

(51) Int. Cl.
| | | |
|---|---|---|
| *B32B 27/08* | (2006.01) | |
| *B29C 47/00* | (2006.01) | |
| *C09J 7/00* | (2018.01) | |
| *B32B 27/30* | (2006.01) | |
| *B32B 27/32* | (2006.01) | |
| *B32B 27/34* | (2006.01) | |
| *B32B 7/12* | (2006.01) | |
| *B32B 27/36* | (2006.01) | |
| *B29C 47/06* | (2006.01) | |
| *B29C 47/88* | (2006.01) | |
| *B29C 55/28* | (2006.01) | |
| *B29C 53/20* | (2006.01) | |
| *B29C 48/10* | (2019.01) | |
| *B29C 48/00* | (2019.01) | |
| *B29C 48/21* | (2019.01) | |
| *B29C 48/22* | (2019.01) | |
| *B29C 48/88* | (2019.01) | |
| *C09J 123/08* | (2006.01) | |

(Continued)

(52) U.S. Cl.
CPC .......... *B32B 27/08* (2013.01); *B29C 48/0018* (2019.02); *B29C 48/0019* (2019.02); *B29C 48/0022* (2019.02); *B29C 48/08* (2019.02); *B29C 48/10* (2019.02); *B29C 48/21* (2019.02); *B29C 48/22* (2019.02); *B29C 48/91* (2019.02); *B29C 48/914* (2019.02); *B29C 48/919* (2019.02); *B29C 53/20* (2013.01); *B29C 55/28* (2013.01); *B32B 7/12* (2013.01); *B32B 27/30* (2013.01); *B32B 27/306* (2013.01); *B32B 27/32* (2013.01); *B32B 27/327* (2013.01); *B32B 27/34* (2013.01); *B32B 27/36* (2013.01); *C09J 7/29* (2018.01); *C09J 123/08* (2013.01); *B29C 55/26* (2013.01); *B29C 2793/0036* (2013.01); *B29K 2023/12* (2013.01); *B29K 2105/0097* (2013.01); *B29K 2995/0067* (2013.01); *B29L 2009/00* (2013.01); *B29L 2031/712* (2013.01); *B32B 2250/05* (2013.01); *B32B 2250/24* (2013.01); *B32B 2307/50* (2013.01); *B32B 2307/7242* (2013.01); *B32B 2307/7265* (2013.01); *B32B 2323/04* (2013.01); *B32B 2323/10* (2013.01); *B32B 2439/02* (2013.01); *B32B 2439/70* (2013.01); *B32B 2553/00* (2013.01); *C09J 2423/04* (2013.01); *C09J 2423/10* (2013.01); *C09J 2423/106* (2013.01); *C09J 2429/006* (2013.01); *C09J 2477/00* (2013.01)

(58) Field of Classification Search
CPC ......... B32B 27/08; B32B 7/12; B32B 27/309; B32B 27/327; B32B 27/34; B32B 27/36; B32B 2250/24; B32B 2250/05; B29C 47/0059; B29C 47/0026; B29C 47/0057; B29C 47/0065; B29C 47/067; B29C 47/8845; B29C 47/8895
See application file for complete search history.

(56) References Cited

U.S. PATENT DOCUMENTS

| | | |
|---|---|---|
| 2,923,966 A | 2/1960 | Tooke, Jr. et al. |
| 3,264,272 A | 8/1966 | Rees |

(Continued)

FOREIGN PATENT DOCUMENTS

| | | |
|---|---|---|
| EP | 0266994 A2 | 11/1988 |
| WO | 2005/090425 A1 | 9/2005 |

(Continued)

OTHER PUBLICATIONS

Morris, "Peel Strength Issues in the Blown Film Coextrusion Process" paper presented at the 1996 TAPPI Polymers, Laminations and Coatings Conference.

(Continued)

*Primary Examiner* — Robert D Harlan

(57) ABSTRACT

Disclosed is a composition that comprises or is produced from a first ethylene α-olefin copolymer, a modified first ethylene α-olefin copolymer, and a second ethylene α-olefin copolymer or propylene α-olefin copolymer. Also disclosed is a multilayer film or sheet structure containing at least one barrier layer; at least one predominantly propylene-based layer, at least one predominantly ethylene-based layer, or both; and at least one adhesive layer produced from the composition. Further disclosed is a produced for producing a multilayer structure using the composition as adhesive layer.

16 Claims, 1 Drawing Sheet

(51) Int. Cl.
*C09J 7/29* (2018.01)
*B29C 48/08* (2019.01)
*B29C 48/91* (2019.01)
*B29C 55/26* (2006.01)
*B29K 23/00* (2006.01)
*B29K 105/00* (2006.01)
*B29L 9/00* (2006.01)
*B29L 31/00* (2006.01)

(56) References Cited

U.S. PATENT DOCUMENTS

| | | |
|---|---|---|
| 3,278,663 A | 10/1966 | Graham |
| 3,337,665 A | 8/1967 | Underwood et al. |
| 3,355,319 A | 11/1967 | Rees |
| 3,404,134 A | 10/1968 | Rees |
| 3,456,044 A | 7/1969 | Pahlke |
| 3,520,861 A | 7/1970 | Waples et al. |
| 3,645,992 A | 2/1972 | Elston |
| 4,076,698 A | 2/1978 | Anderson et al. |
| 4,248,990 A | 2/1981 | Pieski et al. |
| 4,405,667 A | 9/1983 | Christensen et al. |
| 4,590,106 A | 5/1986 | Hsu et al. |
| 4,612,155 A | 9/1986 | Wong et al. |
| 4,666,988 A | 5/1987 | Neill et al. |
| 4,735,855 A | 4/1988 | Wofford et al. |
| 4,760,116 A | 7/1988 | Roberts |
| 4,769,421 A | 9/1988 | Hwo |
| 4,774,290 A | 9/1988 | Neill et al. |
| 4,797,235 A | 1/1989 | Garland et al. |
| 4,847,164 A | 7/1989 | Neill et al. |
| 4,886,634 A | 12/1989 | Strutzel et al. |
| 5,028,674 A | 7/1991 | Hatch et al. |
| 5,057,593 A | 10/1991 | Marshall et al. |
| 5,198,401 A | 3/1993 | Turner et al. |
| 5,278,272 A | 1/1994 | Lai et al. |
| 5,346,963 A | 9/1994 | Hughes et al. |
| 5,405,922 A | 4/1995 | Dechellis et al. |
| 5,523,358 A | 6/1996 | Hirose et al. |
| 5,643,999 A | 7/1997 | Lee et al. |
| 5,798,420 A | 8/1998 | Cozewith et al. |
| 5,827,559 A | 10/1998 | Powell |
| 6,184,298 B1 | 2/2001 | Lee |
| 6,500,888 B2 | 12/2002 | Baumgartner et al. |
| 6,518,365 B1 | 2/2003 | Powell et al. |
| 6,525,157 B2 | 2/2003 | Cozewith et al. |
| 6,881,800 B2 | 4/2005 | Friedersdorf |
| 6,960,635 B2 | 11/2005 | Stevens et al. |
| 7,608,668 B2 | 10/2009 | Li Pi Shan et al. |
| 7,713,636 B2 | 5/2010 | Song et al. |
| 2009/0035594 A1* | 2/2009 | Lee .............. B32B 7/12 428/476.9 |
| 2013/0296497 A1 | 11/2013 | Jeong et al. |

FOREIGN PATENT DOCUMENTS

| | | | |
|---|---|---|---|
| WO | 2005/090426 A1 | 9/2005 | |
| WO | 2005/090427 A1 | 9/2005 | |
| WO | WO-2005090425 A1 * | 9/2005 | .............. C08F 10/00 |
| WO | 2008/021154 A1 | 2/2008 | |

OTHER PUBLICATIONS

P Dias et al, "Adhesion of statistical and blocky ethylene—octene copolymers to polypropylene", Polymer 49 (2008), pp. 2937-2946.

Y. Lin et al, "Adhesion of olefin block copolymers to polypropylene and high density polyethylene and their effectiveness as compatibilizers in blends", Polymer 52 (2011) pp. 1635-1644.

PCT International Search Report and Written Opinion for International Application No. PCT/US2015/044956 dated Oct. 8, 2015.

* cited by examiner

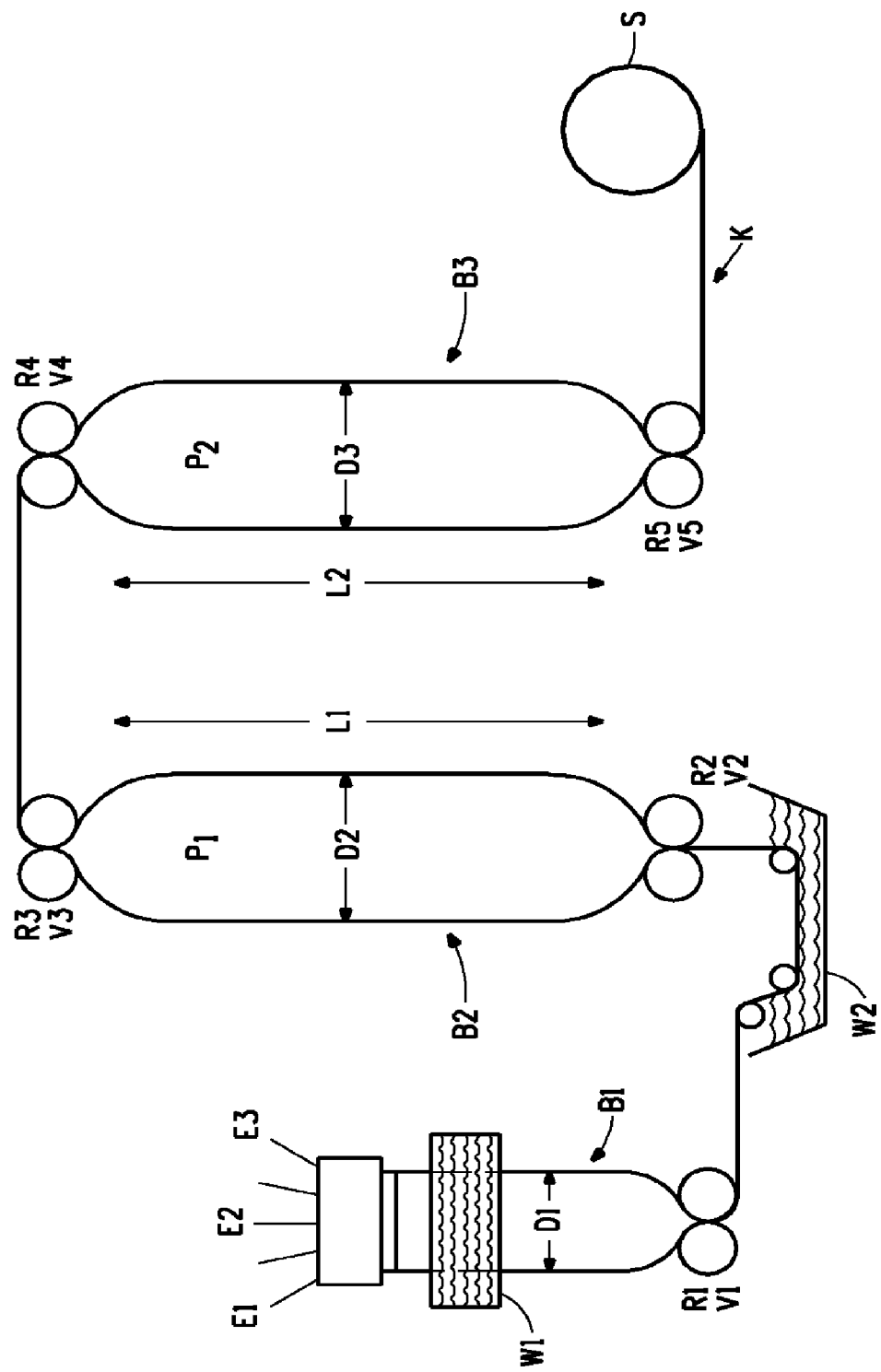

MULTILAYER STRUCTURE COMPRISING POLYPROPYLENE

RELATED APPLICATION

This application claims priority under 35 U.S.C. § 119(c) to provisional application No. 62/036,817 filed Aug. 13, 2014 which is incorporated by reference in its entirety.

BACKGROUND OF THE INVENTION

The invention relates to a multilayer film or sheet structure containing at least one barrier layer, at least one predominantly propylene-based layer and at least one predominantly ethylene-based layer, and at least one predominantly ethylene-based adhesive layer.

Packaging films and sheets are increasingly manufactured by coextrusion systems of growing sophistication. Whereas many years ago, it was common to have machines capable of coextruding three to five layers, such systems today can routinely coextrude nine layers or more, using an equal number of extruders to feed these layers. The new systems allow many types of polymers to be used for better tailoring of multiple properties required in packaging structures, such as barrier, toughness, sealability, gloss, transparency, impact resistance, while lowering overall raw material cost by using less of the expensive components. The polymers themselves many be further blended with other polymers. Additives may be added to the polymers, such as slips or antiblocks, antifog, anti-oxidants, color masterbatches, and the like. Further, the increasing complexity of the material combinations also requires more complicated logistics and handling to ensure that the right materials are delivered to the right extruders during production and to maintain proper inventory economically.

Many packaging films and laminates contain layers of polar polymers such as polyamide and ethylene vinyl alcohol to provide gas and flavor barriers. With the increasing number of extruders in coextrusion systems it is not uncommon to not only have an ethylene vinyl alcohol layer or a polyamide layer, but also combinations of these layers. Tri-layer combinations of barrier cores or barrier sandwiches comprising a coextrusion of polyamide-ethylene vinyl alcohol-polyamide are widely employed as a method to improve formability in films and sheets. In many cases, the sealant side of the coextrusion construction, that is, the layers between the barrier core and the packaged product are frequently ethylene polymer-based to make use of their good sealing properties. Examples of such sealants are ethylene ionomers, ethylene acid copolymers, ethylene vinyl acetate copolymers, ethylene α-olefin copolymers. In many cases, the exterior side of the coextrusion construction, that is, the layers between the barrier core and the outer layer of the package that does not contact the packaging contents, is composed of propylene polymers. The propylene polymers provide stiffness, moisture barrier, and they also provide a higher temperature resistance that prevents the film laminate from being deformed when contacted against a sealing bar during heat sealing of such laminates. The temperatures of the seal bars can be very high, particularly for thicker laminates, as heat must be transferred from the seal bar to the internal sealant layer within the short contact times necessary for profitable commercial production. For that reason, it can also be common for polyamide to be employed as the outermost exterior layer of the film laminate with polypropylene layers internal to that layer on the exterior side of the coextrusion construction. Consequently, as many as three or more tie layers may be employed in nine or higher layer coextrusions. It would be ideal if a single adhesive resin could be used for all adhesive layers to avoid mistakes with charging the wrong adhesive into the extruder hoppers, and to minimize inventory complications with maintaining multiple resins.

Generally speaking, high crystallinity polypropylene (PP) and polyethylene (PE) polymers are not compatible with each other. Most crystalline polyethylene resins do not adhere well to polypropylene and vice-versa. Ethylene copolymer-based adhesives may be employed, such as ethylene vinyl acetate and ethylene methyl acrylate adhesives, but these adhesives do not have sufficient high temperature resistance and may fail when packages are subject to cooking conditions, particularly those at high temperatures and long times. Lower density ethylene-α-olefin copolymer or higher comonomer propylene-α-olefin copolymer based adhesives may also be used, but they suffer from the same temperature issues as they are also lower crystallinity resins because of their high comonomer. They are also more expensive than their lower or no-comonomer polyethylene and polypropylene resin counterparts.

U.S. Pat. No. 4,405,667 discloses a retortable packaging pouch where the sealant layer is polyethylene and the outer layer is a polyamide. Internal layers of polyamide and ethylene vinyl alcohol are described. The pouch can contain up to 9 layers where one or more of the layers is polypropylene-based. The sealant PE is bonded to the propylene layers by a blend of linear low density polyethylene and a propylene ethylene copolymer. The layer directly adhering to the nylon is an anhydride-modified polypropylene.

U.S. Pat. No. 4,735,855 discloses a thermoformable film laminate in which the sealant layer is an ionomer or ethylene copolymer and is directly adhered to both a nylon, ethylene vinyl alcohol, nylon barrier core and a polypropylene outer layer. The tie layers bonding to the barrier, the sealant and the outer polypropylene layers may be identical or different from each other and may include a wide range of anhydride grafted polyolefins. The examples demonstrate only anhydride modified ethylene vinyl acetate polymers as adhering the sealant and polypropylene to the barrier polymer.

U.S. Pat. No. 5,643,999 discloses a coextrudable adhesive composition, for bonding polyolefin film to ionomer film, produced by blending polyethylene with a very low density polyethylene (VLDPE) together with a hydrocarbon elastomer. However, such adhesive composition does not adequately bond polyolefin film layer to barrier layer, for water, oxygen or other substances, such as polyamide or ethylene vinyl alcohol (EVOH) layer.

U.S. Pat. No. 6,184,298 discloses an adhesive composition of an anhydride modified polyethylene, an unmodified polyethylene and a styrene-based elastomer as being useful in multilayer structures containing nylon or EVOH as the barrier, and having polypropylene as one substrate and polyethylene as another.

U.S. Pat. No. 7,713,636 discloses a multilayer film comprising a PP core layer, an outer barrier skin layer and an optional second skin layer on the opposite side of the core layer than the barrier skin layer, where the optional second skin layer is selected from the group consisting of a PE polymer or copolymer, a PP polymer or copolymer, an ethylene propylene copolymer and an ethylene vinyl acetate polymer. A tie layer is disposed between the skin and core layers, and comprises at least 10 w % grafted propylene-based polymer containing 5 to 24 weight % ethylene and having a DSC melting temperature of 120° C. or less and a heat of fusion of 75 J/g or less.

More recent commercial advances in α-olefin copolymerizations using single site or metallocene catalysts in $C_2$ to $C_8$ α-olefins have resulted in copolymers that have a more blocky characteristic, where the block segments themselves are ethylene α-olefin copolymers and different blocks are distinguished by different comonomer content to tailor the block crystallinity. Such copolymers have been found to improve adhesion between polypropylene and high density polyethylene when used as the tie layer material in experiments conducted by Case Western University. (P Dias et al, Polymer 2008; 49:2937-2946 and Y. Lin et al, Polymer 2011; 52:1635-1644). Here, the polymers are used at 100% in the tie layer on a lab line extruding a small tape of about 2 mm thick and 12 mm wide. Line speeds were not disclosed.

It is particularly desired that an adhesive composition that provides high bond strength to multilayer barrier films where one tie layer type can be used to bond polypropylene polymers and copolymers to a polar barrier substrate as well as to polyethylene polymers, ethylene α-olefin copolymers and ethylene copolymers such as ethylene acid ionomers, ethylene acid copolymers, ethylene vinyl acetate and ethylene acrylate copolymers. In particular, it is challenging to find a common tie layer to bond polypropylene and ethylene acid ionomers of sodium and highly neutralized ethylene acid ionomers within a multilayer barrier structure.

SUMMARY OF THE INVENTION

A composition comprises or is produced from a blend comprising, consisting essentially of, or consisting of (1) a first ethylene α-olefin copolymer, (2) a modified first ethylene α-olefin copolymer, and (3) a second ethylene α-olefin copolymer or a propylene α-olefin copolymer wherein the composition can be used as an adhesive composition;

the total weight of the first ethylene α-olefin copolymer and the modified first ethylene α-olefin copolymer is preferably about 65 to about 85%, based on the total weight of the composition;

the modified first ethylene α-olefin copolymer is an ethylene α-olefin copolymer that has been grafted with a dicarboxylic acid, an anhydride of the dicarboxylic acid, or combinations thereof;

the first ethylene α-olefin copolymer can contain ≤5 mole % of α-olefin, have DSC melting point ≥115° C., and have an enthalpy of fusion, as measured by DSC in the second heat, ≥100 J/g;

the modified first ethylene α-olefin (e.g., $C_4$ to $C_8$) copolymer can have a DSC melting point of 115° C. or higher; can have an enthalpy of fusion, as measured by DSC in the second heat, of 100 J/g or higher; and can-contain 0.03 to 3 weight %, based on a total adhesive composition, of an anhydride moiety or dicarboxylic acid moiety;

the second ethylene α-olefin copolymer or propylene α-olefin copolymer can be present in the blend from about 15 w % to about 35 w %, based on the weight of the blend;

the second ethylene α-olefin copolymer can contain ≥8 mole % of a $C_4$ to $C_8$ even numbered α-olefin with a DSC melting point of 115° C. or higher and an enthalpy of fusion, as measured by DSC in the second heat, of 80 J/g or lower; and the propylene α-olefin copolymer can contain ≥8 mole % of one or more $C_2$ to $C_8$ even-numbered α-olefin and can have an enthalpy of fusion, as measured by DSC in the second heat, of 80 J/g or lower.

A multilayer structure contains or is produced from at least one core barrier layer, at least one predominantly propylene-based layer disposed on one side of a core barrier layer and at least one tie layer disposed on the other side of the core barrier layer, where the tie layer can comprise, or is, the adhesive composition disclosed above.

A multilayer structure contains or is produced from at least one barrier layer, at least one predominantly propylene-based layer and/or at least one predominantly ethylene-based layer, and at least one adhesive layer wherein the adhesive layer can comprise, or is, the composition disclosed above.

A multilayer structure can contain or be produced from at least one core barrier layer, at least one predominantly propylene-based layer disposed on one side of a core barrier layer, at least one predominantly ethylene-based layer disposed on the other side of the core barrier layer, and at least one tie layer wherein the tie layer can comprise, or be, the composition disclosed above.

A process comprises coextruding a first polymer, a second polymer, a third polymer, and optionally a fourth polymer to produce a multilayer structure comprising a first layer, a second layer, a third layer, and an optional additional layers wherein the layers are optionally in sequence;

the first layer, the second layer, the third layer, the optional fourth layer correspond to, respectively, the first polymer, the second polymer, the third polymer, and the optional fourth polymer;

the first layer, the second layer, the third layer, the optional fourth layer can be in any order; but, however, it is preferred that the first layer, the second layer, the third layer, the optional fourth layer is in such sequential order; and the first polymer can comprise or be produced from at least one predominantly propylene-based polymer;

the second polymer can comprise or be produced from the adhesive composition disclosed above;

the third polymer can comprise or be produced from a barrier polymer; and the optional fourth polymer can comprise or be produced from at least one predominantly propylene-based polymer, at least one predominantly ethylene-based polymer, or both.

BRIEF DESCRIPTION OF THE DRAWINGS

FIG. 1 shows a schematic overview of the triple bubble process of the invention.

DETAILED DESCRIPTION OF THE INVENTION

Trademark is written in upper case. The description following the verb "is" can be or is a definition.

The multilayer disclosed herein can be a film or sheet. A film is known to one skilled in the art as having a thickness of about 12 mils or thinner whereas a sheet is thicker than about 12 mils. The multilayer structure can have a thickness from about 1 mil to about 250 mils and can be used for packaging foodstuffs, durable materials, chemicals, personal care items, medical or pharmaceutical goods, nutraceuticals, and the like.

An adhesive composition can comprise or be produced from a blend of an anhydride-modified polyethylene or anhydride-modified first ethylene α-olefin copolymer and a second ethylene α-olefin copolymer or propylene α-olefin copolymer.

As disclosed above, the first ethylene α-olefin copolymer is a copolymer of ethylene and an α-olefin having 4, 6, or 8 carbons. It can contains from 0 to 5 mole % α-olefin as measured on the basis of the ethylene copolymer, has a DSC melting point of 115° C. or higher, and has an enthalpy of fusion, as measured by DSC in the second heat, of 100 J/g or higher. The DSC method is a thermal method using differential scanning calorimetry and is described in ASTM D3418 where the melt point and enthalpy is measured during the second thermal cycle. The molar composition of the ethylene α-olefin is measured by nuclear magnetic resonance spectroscopy (NMR) using carbon 13.

The term "anhydride-modified" can also include "acid-modified". For the convenience, this disclosure uses "anhydride-modified" can also include "acid-modified". The modifying agent can include an unsaturated dicarboxylic acid, an unsaturated dicarboxylic acid anhydride, or a derivative of the acid, the anhydride, or both. Similarly, for the convenience, the first ethylene α-olefin copolymer is sometimes shortened here in anhydride modification as "ethylene polymer" to simplify the description even it is apparent from the above disclosure that the second ethylene α-olefin by its very description is exclusive from the first ethylene α-olefin. The ethylene polymer in the anhydride modified ethylene polymer can include the first ethylene α-olefin copolymer or a different first ethylene α-olefin copolymer and can be the same as, or different from, an unmodified ethylene polymer for the multilayer structure, so long as the base ethylene polymer before modification falls within the range so disclosed.

The anhydride-modified ethylene polymer can also be a blend of different anhydride modified ethylene polymers mixed with the unmodified ethylene polymers.

The concentration of graft can be such that the total composition of the adhesive contains from 0.03 to 3 weight % of an unsaturated dicarboxylic acid anhydride or its derivative. A grafting agent which can be used include, but are not limited to, acrylic acid, methacrylic acid, fumaric acid, maleic acid, nadic acid, citraconic acid, itaconic acid, an anhydride of each acid, a metal salt of each acid, an ester of each acid, an amide of each acid, an imides of each acid, and the like, or combinations of two or more thereof. The preferred grafting agents are maleic acid and maleic anhydride, especially the latter. The method of grafting onto the ethylene polymer can be any of the processes well known in the art. For example, grafting can be carried out in the melt without a solvent, as disclosed in EP0266994, U.S. Pat. Nos. 4,612,155, 5,346,963, or in solution or dispersion or in a fluidized bed as in U.S. Pat. No. 5,523,358. Melt grafting can be done in a heated extruder, a BRABENDER® or a BANBURY® mixer or other internal mixers or kneading machines, roll mills and the like. The grafting may be carried out in the presence or absence of a radical initiator such as a suitable organic peroxide, organic perester, or organic hydroperoxide. The grafted polymers are recovered by any method which separates or utilizes the graft polymer that is formed. Thus, the graft polymer can be recovered in the form of precipitated fluff, pellets, powders and the like. The art of grafting uniformly is well known, and the acid-grafted resin should be as uniformly grafted as possible. It is within the skill of the artisan to achieve satisfactory uniformity of the grafting for any given level of total grafting.

The second ethylene α-olefin copolymer is a copolymer of ethylene and an α-olefin having 4, 6, or 8 carbons. It may contain greater than 10 mole % α-olefin as measured on the basis of the ethylene copolymer, and have a DSC melting point of 115° C. or higher. It may also have an enthalpy of fusion of 80 J/g or lower. One skilled in the art readily recognize that one method of achieving an ethylene copolymer with relatively high comonomer, high melting point, but with very low crystallinity can be through the manufacture of ethylene α-olefin block copolymers such as described in U.S. Pat. No. 5,798,420. U.S. Pat. No. 7,608,668, WO2005090425, WO2005090426, WO2005090427, and US2013/0296497.

The propylene α-olefin in a copolymer or terpolymer of propylene and α-olefin can have 2, 4, 6, or 8 carbons. The copolymer or terpolymer of propylene and α-olefin may contain greater than 8 mole % of α-olefin as measured on the basis of the propylene polymer weight, and may have an enthalpy of fusion of 80 J/g or lower. Suitable methods for producing such propylene-based polymers include U.S. Pat. Nos. 6,881,800, 6,525,157, and 6,960,635.

Melt indexes of the components of the adhesive composition are not limited and can vary from 0.1 to 100, with the appropriate melt index of the individual components selected to provide an optimum overall melt index that is suitable for processing in the application, while maintaining excellent physical and mechanical properties.

The components of the adhesive composition can be combined to produce the adhesive by any method known to one skilled in the art such as dry or melt blending using an extruder, such as twin screw extruders, single screw extruders, Banburies, Buss-Kneaders and the like. For example, the components may be admixed together to form a "pellet" blend or directly melted in an extruder to form a "melt" blend, which may be fed to the process for the formation of a packaging film, multilayer film, sheet or multilayer sheet. Any of the blend components may be dried as desired before, during or after the blending process. Such methods are well known in the art and description of which is omitted herein for the interest of brevity. If melt blended, the adhesive composition may also be further dry blended with polyolefins during coextrusion to produce the multilayer construction so long as high peel strengths continue to be maintained.

The adhesive composition may further contain small amounts of other materials commonly used and known in the art, such as anti-oxidants, anti-blocks, stabilizers including ultra-violet stabilizers, plasticizers, processing aids, flow enhancing additives, flow reducing additives, lubricants, flame retardants, nucleating agents and fillers.

A multilayer structure disclosed herein can comprise a predominantly ethylene-based structural layer that can include almost any polymer containing ethylene repeat units such as, for example, linear and branched ethylene homopolymers; ethylene α-olefin copolymers; ethylene vinyl acetate polymers; ethylene acrylic or methacrylic acid polymers and their corresponding ionomers neutralized with metal or amine cations; ethylene acrylate and methacrylate polymers.

Polyethylene and ethylene α-olefin copolymers can be prepared by well-known Ziegler-Natta methods (e.g., U.S. Pat. Nos. 4,076,698 and 3,645,992), catalyzed in solution, slurry, gas phase, or on a support. Metallocene catalysts can also be used to produce ethylene α-olefin copolymers using conditions also well-established in the prior art to produce the so-called metallocene resins. Suitable conditions and catalysts which can produce substantially linear metallocene resins are described, for example, in U.S. Pat. Nos. 5,278,272, 5,198,401 and 5,405,922; the disclosures of which are herein incorporated by reference. The densities of suitable polyethylenes and ethylene α-olefins copolymers can range for about 0.865 g/cc to about 0.970 g/cc. Preferred α-olefins are 1-butene, 1-hexene and 1-octene. The choice of the polyethylene or ethylene α-olefin may depend on the function of the predominantly ethylene-based structural layer. For example, if stiffness and good moisture vapor barrier is desired, then high density polyethylene may be used; if good sealability at high line speeds and relatively low sealing temperatures are required, then an ethylene α-olefin of 0.900 to 0.910 g/cc density may be desired; and if the structural layer is required as a bulking layer, then a linear low density polyethylene of density 0.918 g/cc made on a gas-phase reactor provides a good combination of reasonable cost, clarity and toughness. Different combinations of such resins can also be used. Those skilled in the art can recognize that polyethylenes described as high density, medium density, linear low density, and very low density or ultra-low density polyethylenes made by Ziegler-Natta or metallocene synthesis all describe ethylene α-olefin copolymers or terpolymers made with varying levels of α-olefin comonomer ranging from 0 w % to about 40 w %.

Polyethylene and copolymers or terpolymers of ethylene with vinyl acetate, alkyl acrylate, and/or α-,β-ethylenically unsaturated carboxylic acid comonomers made by a high pressure process are also widely available commercially. Homopolyethylene made by this process is commonly known as low density polyethylene (LDPE) with density from about 0.91 to about 0.935 g/cc. In some instances, very low levels of vinyl acetate, typically below 5 wt % may be incorporated in commercial LDPE. Ethylene copolymers incorporating vinyl acetate monomer can contain from about 6 weight % to as high as 45 weight % vinyl acetate, with a range of 6 weight % to 30 weight % being more commonly employed in multilayer structures of this invention.

Ethylene alkyl (meth)acrylate copolymers include copolymers of ethylene and alkyl acrylates and/or alkyl methacrylates wherein the alkyl moiety contains from 0 to 4 or 1 to 4 carbon atoms. Preferred examples of alky (meth) acrylate include methyl acrylate, ethyl acrylate and butyl acrylate. Of note are ethylene butyl acrylate copolymers prepared from iso-butyl acrylate or n-butyl acrylate. The relative amount of the alkyl (meth)acrylate can vary from a few weight percent to as high as 40 weight % or greater, with a range of about 6 weight % to about 30 weight % being preferred. Ethylene acid copolymers comprising α-,β-ethylenically unsaturated carboxylic acid comonomers may include acrylic acid, methacrylic acid, itaconic acid, maleic acid, maleic anhydride, fumaric acid, monomethyl maleic acid, or combinations of two or more thereof.

The ethylene acid copolymers may be further neutralized by metallic ions to produce ionomers. The metallic ions may be monovalent, divalent, trivalent, multivalent, or combinations of two or more thereof including Na, K, Li, Ag, HG, Cu, Be, MG, Ca, Sr, Ba, Cd, Sn, Pb, Fe, Co, Ni, Zn, Al, Sc, Y, Ti, Zr, Hf, V, Ta, W, Cr, Ce, iron, complexing agent (e.g., stearate radical, oleate radical, salicylate radical, phenolate radical, or combinations of two or more thereof), or combinations of two or more thereof. Frequently used metallic ion includes Na. Li, Mg, Zn, AL, or combinations of two or more thereof. Acid copolymers may be neutralized as disclosed in U.S. Pat. Nos. 3,404,134, 4,666,988, 4,774,290, and 4,847,164.

The acid copolymers and the ionomers independently may optionally contain other unsaturated comonomers including an alkyl or hydoxyalkyl (meth)acrylate where the alkyl group can be hydrogen or $C_{1-10}$ alkyl, straight or branch, glycidyl acrylate, glycidyl methacrylate, poly(ethylene glycol)acrylate, poly(ethylene glycol)methacrylate, poly(ethylene glycol) methyl ether acrylate, poly(ethylene glycol) methyl ether methacrylate, poly(ethylene glycol) 4-nonylphenyl ether acrylate, poly(ethylene glycol) 4-nonylphenyl ether methacrylate, poly(ethylene glycol) phenyl ether acrylate, poly(ethylene glycol) phenyl ether methacrylate, dimethyl maleate, diethyl maleate, dibutyl maleate, dimethyl fumarate, diethyl fumarate, dibutyl fumarate, dimenthyl fumarate, vinyl acetate, vinyl propionate, or combinations of two or more thereof. The ethylene copolymers may incorporate about 0.001 to about 50, about 0.001 to about 25, or about 0.001 to about 10, weight % of the other unsaturated comonomer, based on the total weight of the composition and may be produced as disclosed in U.S. Pat. Nos. 3,264,272, 3,355,319, 3,404,134, 3,520,861, 4,248, 990, 5,028,674, 5,057,593, 5,827,559, 6,500,888, and 6,518, 365. The total acid functionality of the final blend of the acid copolymer component and the ionomer may be neutralized to a level of at least 10% or more with metal ions and the article made therefrom may have the desirable ionomer attributes of enhanced oil/grease resistance, enhanced optical properties, higher tensile strength, higher impact resistance, lower Melt Index (higher viscosity), greater toughness, higher stiffness, better abrasion resistance, higher melt strength, less blocking, and improved thermal stability through the reduction of the formation of anhydrides, when compared to acid copolymers.

Commercial examples of these polymers include ELVAX® ethylene vinyl acetate, ELVALOY® AC ethylene alkyl acrylate, NUCREL® ethylene acid and SURLYN® ethylene ionomer resins from E. I. du Pont de Nemours and Company, Wilmington, Del. (DuPont).

A multilayer structure disclosed herein can comprise a predominantly propylene-based structural layer that can be a polypropylene or a copolymer or terpolymer of propylene and an α-olefin. Polypropylene can include semi-crystalline homopolymers, random copolymers, block copolymers and terpolymers of propylene.

Polypropylene homopolymers or random copolymers can be manufactured by any known process. For example, propylene polymers can be prepared in the presence of Ziegler-Natta catalyst systems or metallocene catalyst systems. Block copolymers can be manufactured similarly except that propylene is generally first polymerized by itself or with ethylene in the first reactor phase to form the semicrystalline matrix and low crystallinity or amorphous segments of propylene and ethylene are then copolymerized, in a second stage or subsequent stages, in the presence of the polymer produced in the first reactor. Additional information related to block copolymers and to their manufacture may be found in various handbooks or published scientific articles. One such reference "Block Copolymers" edited by D. C. Allport and W. H. Janes, published by Applied Science Publishers Ltd in 1973, Chapters 4.4 & 4.7, is frequently cited and is incorporated by reference in the present description. Commercial polypropylene block copolymers are widely available from multiple polypropylene producers and encompass a wide range of grades.

The copolymers and terpolymers of propylene can contain the comonomers inserted in a random manner so that the main chain crystallinity is disrupted, leading to drops in the melt point of the polymer from about roughly 165° C. or so as the homopolypropylene to as low as about 130° C. in the random copolypropylene depending on the amount and type of α-olefin comonomer in commercially available grades.

The copolymers and terpolymers of polypropylene can be copolymerized in a multi-step process to obtain block copolypropylenes where chain segments consist of relatively crystalline homopolypropylene or random copolypropylene and chain segments of relatively amorphous or low crystallinity propylene ethylene copolymers. The melting points of the block copolymers will be dominated by the more crystalline segments of the copolymer to give either about 165° C. or so if a homopolypropylene block copolymer or lower if a random copolypropylene block copolymer.

A multilayer structure disclosed herein can comprise a barrier resin layer, which can be selected from the group consisting of, a polyamide, an ethylene vinyl alcohol copolymer (EVOH), or combinations of two or more thereof.

A polyamide can be a homopolymer or copolymer of aliphatic polyamides and aliphatic/aromatic polyamides such as polyamide 6, polyamide 9, polyamide 10, polyamide 11, polyamide 12, polyamide 6,6, polyamide 6,6/6, polyamide 6,9, polyamide 6,10, polyamide 6,12, polyamides from 2,2-bis-(p-amino-cyclohexyl)propane; polyamide 6I, polyamide 6T, polyamide 6I,6T, polyamides prepared from terephthalic acid and/or isophthalic acid and trimethylhexamethylenediamine as well as those prepared from adipic acid, azelaic acid, from terephthalic acid and 4,4'-diaminocyclohexylmethane, and polyamide MXD6 (comprising m-xylylenediamine and adipic moieties), copolymers thereof, or combinations of two or more thereof. Commercially available polyamide includes SELAR® PA from DuPont.

An EVOH copolymer can be commercially available with ethylene content ranging from about 24 mole % ethylene to about 48 mole %.

The selection of barrier resins to use in the multilayer structure may depend on the type of gas barrier required for the application, the conditions at which a package form is fabricated at, the conditions at which the packaging content is being filled and subjected to, as well as the service conditions at which the packaged product is subjected to. It is possible to have one barrier layer or more than one barrier layer. It is possible to have more than one type of polymer in the different barrier layers. The disposition of the barrier layers in the multilayer structure can also include an outer skin layer where the layer provides both barrier as well as toughness or high temperature resistance. The disposition of the barrier layers in the multilayer structures can include a core barrier layer that contains both polyamide and ethylene vinyl alcohol layers.

The multilayer structure disclosed herein also optionally contains other structural layers such as polyester, homopolymers and copolymers, and styrene homo and copolymers. For example, a barrier layer (polyamide or ethylene vinyl alcohol layer) or a plurality of barrier layers for example, two or more layers of polyamide and EVOH layer in any combination can serve as core layers in a multilayer laminate with a predominate propylene-based layer, ethylene-based layer, or both; or the barrier layer can be an outer layer on one side of the multilayer laminate that may also contain other barrier layer or barrier layers in the core. Barrier layer combinations can be PA/EVOH/PA, PA/EVOH/PA/EVOH. EVOH/PA/EVOH, or any other configurations including more layers where PA refers to polyamide layer and EVOH refers to EVOH layer, and the forward slash "/" denotes "between layers".

Illustrative examples of multilayer structures can include the following, where the "/" denotes between layers, "Homo" means homopolymer, "PP" is polypropylene layer, "coPP" denotes layer of copolymer of propylene and α-olefin, "PA" is a polyamide layer. "EVOH" is ethylene vinyl alcohol layer. "LLDPE" is a linear low density polyethylene layer, "VLDPE" is a very low density polyethylene layer, "EVA" is ethylene vinyl acetate copolymer layer. "mPE" is a layer of polyethylene, including ethylene α-olefin copolymer, produced by metallocene catalysis, "PET" is a polyethylene terephthalate layer, and "EMA" is an ethylene methacrylate copolymer layer that can also serve as tie layer. The abbreviation "tie" stands for a tie layer that can be the same as, or different from, a layer produced from the composition disclosed above. However, a tie layer between a polyolefin layer and a polyamide or EVOH layer is preferably a layer produced from the above-disclosed composition.

PP/tie/barrier layer(s)/tie/PE
PA/tie/PP/tie/barrier layer(s)/tie/PE/PE/EVA or ionomer
HomoPP/coPP/tie/PE/tie/barrier(s)/tie/PE/PE/mPE
HomoPP/coPP/tie/PA/EVOH/PA/tie/LLDPE/VLDPE;
HomoPP/coPP/tie/PE/tie/PA/EVOH/PA/tie/PE/PE/PE/mPE;
PA/tie/coPP/tie/PA/tie/EVA/EVA;
PA/tie/coPP/coPP/tie/PA/EVOH/PA/tie/ethylene acid copolymer/ethylene ionomer;
coPP/tie/EVOH/tie/mPE;
HomoPP/coPP/tie/PA/EVOH/PA/tie/ethylene ionomer/ethylene acid copolymer; and
PET/EMA/coPP/tie/PA/EVOH/PA/tie/ethylene ionomer/ethylene ionomer;

The multilayer film or sheet or a laminate thereof can have any total thickness desired to provide the desired properties for the particular packaging operation such as a total thickness (a combined thickness of all layers) of about 15 mils to about 50 mils, or less or from about 0.3 to about 15 mils, about 1 to about 10 mils, or 1.5 to 8 mils.

The multilayer structure (laminates) can be used in a variety of applications, including packaging applications. A multilayer film or sheet can have any total thickness desired to provide the desired properties for the particular packaging operation such as a total thickness (a combined thickness of all layers) of about 15 mils or higher, (0.38 millimeters (mm)), or less or from about 0.3 to about 15 mils, about 1 to about 10 mils, or 1.5 to 8 mils. The laminates can be in the form of film, sheet or rigid part such as a bottle or a thermoformed cup or a pipe.

The multilayer laminates can be made by any process known in the art, including blown film, cast film, extrusion coating or lamination, cast sheet, coextruded pipe, extrusion blow molding and injection molding. For example, a multilayer film or sheet can be produced by coextrusion. Coextrusion can be carried out according to any known coextrusion methods. The film or sheet can be manufactured by using so-called "round die" or "flat die" methods. A blown film, sheet or pipe can be prepared by extruding a tube or coextruding polymer compositions through an annular die such that a seamless, tubular multilayer structure having concentric layers of different compositions is prepared. Cast flat films or sheets are prepared by coextruding the individual compositions through a flat die to provide a laminar flow of the layered compositions. The molten laminar flow leaving the die is cooled by at least one roll containing internally circulating fluid (a chill roll) or by a water bath to provide a cast structure.

The multilayer can be useful for preparing laminate films in a rapid film fabrication process while maintaining adhesion. As the term is used herein, a "rapid film fabrication process" is either a high-speed film fabrication process or a fast quench film fabrication process. A high-speed film fabrication process can be described in various ways, depending on the type of film process being used. In the case of (co)extrusion cast film, (co)extrusion coating or (co) extrusion laminating process, a high speed film process is one in which the line speed can vary from between about 50 to about 950 m/min and the air gap, which is defined in the polymer film fabrication art as the distance between the die lip and chill roll, can vary from about 10 mm to about 500 mm. Preferably, for (co)extrusion coating or (co)extrusion lamination processes, the line speed is in the range of from about 80 to about 800 m/min. More preferably the line speed is in the range of from about 100 to about 600, and most preferably from about 100 to about 400 m/min. Preferably the air gap is from about 75 to about 500 mm, more preferably from about 100 to about 450, and most preferably from about 120 to about 350 mm. The terms "die lip" and "chill roll" are known to those of ordinary skill in the art, and have their ordinary meaning as used herein. For a (co) extrusion cast film process, the line speed is preferably in the range of from about 50 to about 400 m/min. More preferably the line speed is from about 60 to about 300 m/min, even more preferably in the range of from about 70 to about 300 m/min, and most preferably in the range of from about 100 to about 250 m/min. The air gap for a (co)extrusion cast film process is in the range of from about 12 to about 100 mm, preferably in the range of from about 25 to about 75 mm.

A fast quench process can be described as a rapid (co) extrusion blown film process, wherein a hot molten blown film is cooled by a gaseous or liquid medium such as chilled air, air containing liquefied gases, chilled water, or air at ambient temperature, for example. For example, in a fast quench process, a layer of polyolefin, an adhesive layer, and a barrier layer under a condition effective to produce in a first bubble (see further description below) a blown film as known to one skilled in the art, which can be cooled in such a way that the process time is less than about 12 seconds, preferably less than about 8 seconds to effect the production of a coextruded tubular multilayer structure. More preferably the quick cooling can be less than about 6 seconds, and most preferably less than about 5 seconds. The process time can be calculated using the following equation, as described in "Peel Strength Issues In The Blown Film Coextrusion Process" by Dr. Barry Morris in a paper presented at the 1996 TAPPI Polymers, Laminations and Coatings Conference.

$$t_f = \left[ \frac{h_f}{V_f \left(1 - \frac{R g_f \rho_f}{g_o \rho_o}\right)} \right] \ln\left( \frac{g_o \rho_o}{R g_f \rho_f} \right)$$

Where
R=blow-up ratio (final bubble diameter/die diameter)
$g_f$=gauge of film at the frostline
$g_o$=die gap
$\rho_f$=density of polymer at the frostline
$\rho_o$=density of the polymer at the die exit.

The frost line is defined herein as a line on the outer layer of a blown film bubble wherein the bubble film becomes translucent, that is, that point where the resin begins to solidify. In such case that the frost line is not visible, the frost line is defined as the location on the bubble where the diameter stops increasing in dimension. In a coextrusion film process, several frostlines can be present, one for each layer of the film. For the purposes of the present invention the frost line of a coextruded film will be the lowest frost line (i.e., the frost line of the layer that freezes first).

The quenched solidified coextruded tubular film can then be collapsed to a flat film or sheet and traveled through the line, followed by slitting, with a slit device, the collapsed flat film or sheet to any desired width (and/or length) to be then taken up on an appropriate take up rolls, or it can be collapsed and collected on the take up rolls to be slit on a different slitting machine subsequently.

The film or sheet disclosed here can be further oriented beyond the immediate quenching or casting of the structure, by extruding a laminar flow of molten polymer to produce an extrudate, quenching the extrudate and orienting the quenched extrudate in at least one or more directions.

The film or sheet can be unoriented, oriented in a uniaxial direction (e.g. machine direction), or oriented in a biaxial direction (e.g. machine direction and transverse direction). The film may be biaxially oriented by drawing in two mutually perpendicular directions in the plane of the film to achieve a satisfactory combination of mechanical and physical properties.

Orientation and stretching apparatus to uniaxially or biaxially stretch film or sheet are known in the art and may be adapted by those skilled in the art to produce the films. Examples of such apparatus and processes include e.g. those disclosed in U.S. Pat. Nos. 2,923,966, 3,278,663, 3,337,665, 3,456,044, 4,590,106, 4,760,116, 4,769,421, 4,797,235 and 4,886,634.

Orientation of multilayer film or sheet is generally carried out on a commercial scale using tenterframe or tubular processes conducted at temperatures below the melting point of at least one of the polymers present in the multilayer film.

In the tenterframe process, the multilayer laminate is coextruded through a flat die in the form of a multilayer sheet, quenched onto casting rolls, and then heated up to the appropriate temperature, generally about 50° C. to 110° C. or about 60° C. to about 100° C. before stretching. Stretching is typically conducted in the machine direction through differential speeds of the pull rolls, with the second series of rolls running at a higher speed than the initial set, and in the transverse direction by clips along continuous chains on each side of the sheet holding the edges and travelling further apart in the transverse direction as the sheet moves in the machine direction. Stretching can be done sequentially in each direction or simultaneously. The oriented multilayer laminate may be slit online to the desired widths before being wound onto the final take up rolls, or they can be wound on the take up rolls to be slit to the desired widths separately. Stretching is well-known to one skilled in the art and the description of which is omitted herein for the interest of brevity.

The above-disclosed multilayer structure can also be produced by a triple bubble process. This process allows for the manufacture of coextruded multilayer structures comprising at least one mono- or bi-axially oriented layer of the composition disclosed above with excellent barrier properties as well as good mechanical properties, in combination with other functional layers. The coextrusion may be carried out by connecting multiple extruders processing the corresponding materials, generally in the form of granulates, to a circular or annular die to form a tubular multilayer film.

An example process can be shown in the attached FIGURE where the composition making up at least one corresponding layer in the multilayer film can be fed into extruder 1 (E1) by methods known in the art such as to form the outermost layer of the tubular multilayer film.

The above-disclosed composition can be fed into, for example, extruder 2 (E2) for use as tie layer in the multilayer film by methods known in the art such as to form a middle layer of the tubular multilayer film.

The other polymer layer can be fed into the extruder 3 (E3) by methods known in the art such as to form another layer of the tubular multilayer film.

The first bubble (B1) is formed on one end by the tubular multilayer film, referring to FIG. 1, having a diameter (D1) exiting the die, and on the other end by the set of rolls R1 that form the hermetically closed end of the first bubble B1.

In the first bubble B1, the tubular multilayer film exiting the die and having an initial diameter D1, is quickly cooled in a way such as to obtain a minimum amount of crystallization in the structure.

Quick cooling can be obtained by quenching the exiting tubular coextruded multilayer film through a first water bath W1 having a temperature of from 0.1° C. to 50° C. more preferably of from 0.1° C. to 25° C. and a length of from 0.4 to 5 m or 1 to 3 m. The residence time in the water quenching bath may be adjusted to range of from 1 to 20 seconds.

After cooling, a solidified tubular coextruded multilayer film can be then passed through a set of rolls which are immersed in a second water bath W2 having a temperature of from 60 to 95° C. The second water bath has a variable length of from 1 to 2 meters and the residence time in this bath depending on the speed of the film line can be of from 1 to 20 seconds.

Water bath W2 may be replaced by or supplemented with any suitable heating means, such as for example a hot air blower, an IR heater or heating coils.

Water bath W2 may pre-heat the solidified tubular coextruded multilayer film passing through to a temperature where it can be stretched without ripping, of more than 50° C., from 60° C. to 100° C., or from 65° C. and 90° C. In more general terms, the solidified tubular coextruded multilayer film is heated to a temperature above the glass transition temperature of the layer having the highest glass transition temperature. After being pre-heated in the second water bath W2, the softened tubular coextruded multilayer film is then inflated to form the second bubble. Inflating the softened tubular structure allows for the structure to be oriented by drawing in both MD and TD directions in the second bubble B2, at the same time.

The drawing in the MD direction can be achieved by adjusting the speed V2 of a second set of nip rolls R2 that form the upstream (towards the extruder) end of the second bubble and the speed V3 of a third set of nip rolls R3 that form the downstream (away from extruder) end of the second bubble. Generally, V3 is greater than V2, preferably 2 to 4 times greater than V2. Stated alternatively, the ratio given by V3/V2 is equivalent to the drawing ratio and is preferably of from 2 to 3.

The drawing in the TD direction can be achieved by adjusting the pressure P1 within the second bubble B2. To adjust the pressure P1, the distance L1 between a first set of nip rolls R2 that form the hermetically closed upstream (towards the extruder) end of the second bubble B2, and a second set of nip rolls R3 that form the hermetically closed downstream (away from extruder) end of the second bubble B2 can be adjusted. Reducing the distance L1 between the two sets of nip rolls (R2, R3) may increase the pressure P1, whereas increasing the distance L1 may lower the pressure P1 within the second bubble. After the drawing in the TD direction, the initial diameter D1 of the softened tubular multilayer film can be increased to a diameter D2, wherein the ratio between D2 and D1 can be from 2 to 5 or 2.5 to 3.5.

The tubular multilayer film is oriented by drawing in the second bubble B2 under heating. The heating may be provided for by the passing of the tubular multilayer film though the water bath W2 before the set of nip rolls R2, and may be supplemented with an alternative heat source in order to keep the tubular multilayer film at a temperature of between the glass transition temperature and the melting point of the above-disclosed composition in the second bubble. Preferably, the temperature of the coextruded multilayer film in the second bubble B2 can be higher than 50° C., from 60° C. to 100° C., or from 65° C. and 90° C. In the case where the second water bath W2 is replaced by or supplemented with an alternative heat source such as a hot air blower, IR heater or heating coils, the alternative heat source is preferably located immediately after the second set of nip rolls R2 sealing the upstream (towards the extruder) end of the second bubble.

While passing through the third set of nip rolls R3, the drawn tubular coextruded multilayer film can be flattened to be more easily conveyed.

After passing through the set of rolls R3 the tubular coextruded multilayer film is passed through a fourth set of nip rolls R4 that form the hermetically closed upstream (towards the extruder) end of the third bubble B3, and a fifth set of nip rolls R5 that form the hermetically closed downstream (away from extruder) end of the third bubble B3.

The fourth and fifth sets of nip rolls (R4, R5) are separated by a distance L2 that can be adjusted to increase or decrease the pressure P2 within the third bubble B3 in order to allow the previously drawn tubular coextruded multilayer film to relax in TD direction.

Generally, this can be achieved by adjusting the pressure P2 in the third bubble B3 such that the pressure P2 is lesser than the pressure P1. The pressure is adjusted by modifying the distance L2 between the fourth and the fifth set of nip rolls (R4.R5) of the third bubble B3, which pressure may modify the diameter D3. The relaxation ratio is given by the ratio of D3/D2, whereas D3 is usually lesser than D2 and concurrently the ratio of D3/D2 is smaller than 1. Typically the ratio of D3/D2 can be between 0.8 and 0.95 or between 0.85 and 0.9.

The speed V4 of the fourth set of nip rolls R4 and the speed V5 of the fifth set of nip rolls may be adjusted in order to allow the previously drawn tubular coextruded multilayer film to relax in MD direction.

Generally, this can be achieved by adjusting the speed V5 of the fifth set of nip rolls R5 such that V5 is lesser than V4. The relaxation ratio is given by V5/V4, whereas V5 is usually lesser than V4 and concurrently the ratio of V5/V4 is smaller than 1. Typically the ratio of V5N/V4 can be of from 0.8 to 0.95, more preferably of from 0.85 to 0.9.

The temperature of the third bubble, the pressure P2 and the ratio of V5/V4 may be adjusted individually or in parallel to achieve a tubular coextruded multilayer film exhibiting a thermal shrink ranging of from 1 to 60 percent, when measured at a temperature of from 40 to 100° C.

The temperature of the third bubble can be adjusted by an IR heater, steam or heated air heater, and can be chosen depending on the desired thermal shrink to be present in the finished tubular coextruded multilayer film in MD direction and/or TD direction, upon heating to a temperature exceeding the one set for the third bubble. On the other hand, the tubular coextruded multilayer film may not exhibit any thermal shrink upon heating to a temperature inferior to the one set for the third bubble B3.

The tubular multilayer film is relaxed in the third bubble B3 under heating. In order to keep the tubular multilayer film at a temperature of between the glass transition temperature of the at least one layer of the above-disclosed composition and the melting point of the at least one layer of the above-disclosed composition in the second bubble, an appropriate heating means may be used, such as an IR heater, steam or heated air heater. Preferably, the temperature of the coextruded multilayer film in the third bubble B3 is higher than in the second bubble, more preferably of from 70° C. to 120° C.

Depending in the settings chosen in the third bubble, the coextruded multilayer film structure may exhibit a thermal shrinkage of from 1 to 60 percent, more preferably from 30% to 50%, when exposed to a 90° C. hot water bath for 1 min.

Depending in the settings chosen in the third bubble, the coextruded multilayer film structure may exhibit a thermal shrinkage of from 1 to 10%, more preferably of from 1 to 3% when exposed to a 120° C. hot air circulating oven for 1 min.

After passing through the fifth set of nip rolls R5, the tubular coextruded multilayer film is passed through a set of rolls, flattened and stored on a roll S.

Optionally, the tubular coextruded multilayer film exiting the fifth set of nip rolls R5 can be slit on one side by a slitting knife K to yield a planar coextruded multilayer film that can be stored on a roll S.

The above process provides for the manufacture of a coextruded multilayer film comprising at least one layer of mono- or bi-axially oriented film layer comprising the above-disclosed composition.

The coextruded multilayer film structure may be used in particular in packaging applications, but may also be used in non-packaging applications such as for example, manufacture of tapes or textiles for building, landscaping, or garment applications.

Also provided is an article comprising a coextruded multilayer film structure disclosed above. The article may be used for the packaging of food ingredients having sharp, pointed and/or cutting edges such as for example coffee, rice, meat containing bone or bone splinters, dry noodles.

EXAMPLES

Examples 1-20

A number of examples will be presented below to illustrate the inventive films with adhesive compositions. In some cases, a portion of the coextrusion structure is made rather than the whole because of limitations to the number of extruders to make the layers. However, the inventive nature of the examples will still be obvious.

Examples 1 through 20 and Comparative examples 1 through 14 were coextruded between a layer of homopolypropylene, melt flow rate 3.5 and density 0.9 g/cc and a layer of ethylene vinyl alcohol, EVAL® F171A. Melt flow rate was determined by ASTM D1238 at 230 C/2.16 kg. The adhesives were melted at about 225° C. in a 1.25 inch extruder operated at about 27 rpm. The homoPP was melted at about 227° C. in a 1.25 inch extruder operated at about 45 rpm, while the EVOH was melted at about 227° C. in a 1.25 inch extruder operating at about 34 rpm. All three melt streams were fed through a Brampton™ coextrusion die so as to form a three layer film with the PP at a nominal 50 μm, the interposing tie layer at a nominal 13 μm and the EVOH at a nominal 23 μm. The film was run at about 9 m/min.

The films multilayer laminates so prepared were cut into 1 inch strips in the machine direction, separated at the tie interface and then placed into an Instron to measure peel strength in a T-peel configuration. Testing speed on the Inston was 12 inches/minute and the results of five such strips averaged, as shown in Table 1 below.

TABLE 1

| | Component A | | | | | Component B | | | M Maleic anhydride | Peel |
| | Ethylene Polymer | | Grafted Ethylene Polymer | | On 100% Basis | | | Comonomer | | (% of A + B) | Strength |
| Example | Resin | Wt % | Resin | Wt % | J/g | Mole % | Polymer B | mole % | Wt % | (nominal) | g/25 mm |
|---|---|---|---|---|---|---|---|---|---|---|---|
| Comp 1 | PE2 | 65 | GR1 | 15 | 132 | 3.2 | m EAO 1 | 13.4 | 20 | 0.14 | 1348 ± 527 |
| Comp 2 | PE2 | 55 | GR1 | 15 | 132 | 3.1 | m EAO 1 | 13.4 | 30 | 0.14 | 842 ± 159 |
| Comp 3 | PE3/PE4 | 43/17 | GR1 | 15 | 143 | 2.5 | ZN EAO 1 | 12.8 | 15 | 0.14 | 56 ± 23 |
| Comp 4 | PE3/PE4 | 33/17 | GR1 | 15 | 143 | 2.3 | ZN EAO 1 | 12.8 | 25 | 0.14 | 55 ± 24 |
| Comp 5 | | | | | 100% BYNEL ® 41E687 (Control) | | | | | | 426 ± 126 |
| Comp 6 | PE2 | 59 | GR2 | 21 | 123 | 3.7 | m EAO 1 | 13.4 | 20 | 0.22 | 1845 ± 208 |
| Comp 7 | PE2 | 49 | GR2 | 21 | 123 | 3.7 | m EAO 1 | 13.4 | 30 | 0.22 | 1510 ± 313 |
| Comp 8 | PE2 | 56 | GR2 | 21 | 123 | 3.7 | m ENO 3 | 21.1 | 23 | 0.22 | 546 ± 138 |
| Comp 9 | PE1/PE2 | 40/38 | GR1 | 12 | 131 | 3.2 | mEAO 4 | 10.4 | 10 | 0.11 | 400 ± 311 |
| EX1 | PE1/PE2 | 35/33 | GR1 | 12 | 132 | 3.1 | mEAO 4 | 10.4 | 20 | 0.11 | 1136 ± 150 |
| EX2 | PE1/PE2 | 30/28 | GR1 | 12 | 132 | 3.0 | mEAO 4 | 10.4 | 30 | 0.11 | 2012 ± 348 |
| Comp 10 | PE1/PE2 | 40/38 | GR1 | 12 | 131 | 3.2 | m-EAO 5 | 14.4 | 10 | 0.11 | 1155 ± 109 |
| EX3 | PE1/PE2 | 35/33 | GR1 | 12 | 132 | 3.1 | m-EAO 5 | 14.4 | 20 | 0.11 | 2301 ± 175 |
| EX4 | PE1/PE2 | 30/28 | GR1 | 12 | 132 | 3.0 | m-EAO 5 | 14.4 | 30 | 0.11 | 2817 ± 428 |
| EX5 | PE2 | 54 | GR2 | 21 | 123 | 3.7 | m-EAO 5 | 14.4 | 25 | 0.22 | 1635 ± 155 |
| Comp 11 | PE2 | 75 | GR1 | 15 | 131 | 3.3 | m-EAO 6 | 12.7 | 10 | 0.14 | 878 ± 46 |
| EX6 | PE2 | 55 | GR1 | 15 | 132 | 3.1 | m-EAO 6 | 12.7 | 30 | 0.14 | 2558 ± 247 |
| EX7 | PE1/PE2 | 30/28 | GR1 | 12 | 132 | 3.0 | m-PAO 8 | 13.7 | 30 | 0.11 | 1077 ± 126 |
| Comp 12 | PE2 | 75 | GR1 | 15 | 131 | 3.3 | m-PAO 9 | 18.2 | 10 | 0.14 | 1177 ± 563 |
| EX8 | PE2 | 65 | GR1 | 15 | 132 | 3.2 | m-PAO 9 | 18.2 | 20 | 0.14 | 2333 ± 140 |
| EX9 | PE2 | 55 | GR1 | 15 | 132 | 3.1 | m-PAO 9 | 18.2 | 30 | 0.14 | 1432 ± 271 |
| Comp 13 | PE2 | 75 | GR1 | 15 | 131 | 3.3 | m-PAO 12 | 22.2 | 10 | 0.14 | 883 ± 152 |
| EX10 | PE2 | 65 | GR1 | 15 | 132 | 3.2 | m-PAO 12 | 22.2 | 20 | 0.14 | 2597 ± 97 |
| EX11 | PE2 | 55 | GR1 | 15 | 132 | 3.1 | m-PAO 12 | 22.2 | 30 | 0.14 | 2181 ± 515 |
| EX12 | PE2 | 54 | GR2 | 21 | 123 | 3.7 | m-EAO 5 | 14.4 | 25 | 0.22 | 1635 ± 155 |
| Comp 14 | PE2 | 69 | GR2 | 21 | 124 | 3.7 | m-EAO 6 | 12.7 | 10 | 0.22 | 1089 ± 177 |
| EX13 | PE2 | 59 | GR2 | 21 | 123 | 3.7 | m-EAO 6 | 12.7 | 20 | 0.22 | 2076 ± 205 |
| EX14 | PE2 | 49 | GR2 | 21 | 123 | 3.7 | m-EAO 6 | 12.7 | 30 | 0.22 | 2039 ± 121 |
| EX15 | PE2 | 54 | GR2 | 21 | 123 | 3.7 | m-PAO 8 | 13.7 | 25 | 0.22 | 2489 ± 64 |
| EX16 | PE2 | 59 | GR2 | 21 | 123 | 3.7 | m-PAO 9 | 18.2 | 20 | 0.22 | 1995 ± 249 |

TABLE 1-continued

| | Component A | | | | | Component B | | M Maleic anhydride | Peel Strength |
| | Ethylene Polymer | | Grafted Ethylene Polymer | | On 100% Basis | | Comonomer | | (% of A + B) | |
| Example | Resin | Wt % | Resin | Wt % | J/g | Mole % | Polymer B | mole % | Wt % | (nominal) | g/25 mm |
|---|---|---|---|---|---|---|---|---|---|---|---|
| EX17 | PE2 | 49 | GR2 | 21 | 123 | 3.7 | m-PAO 9 | 18.2 | 30 | 0.22 | 2517 ± 173 |
| EX18 | PE2 | 54 | GR2 | 21 | 123 | 3.7 | m-PAO 10 | 12.2 | 25 | 0.22 | 2316 ± 396 |
| EX19 | PE2 | 54 | GR2 | 21 | 123 | 3.7 | m-PAO 11 | 15.6 | 25 | 0.22 | 2645 ± 249 |
| EX20 | PE2 | 54 | GR2 | 21 | 123 | 3.7 | m-PAO 12 | 22.2 | 25 | 0.22 | 2296 ± 154 |

For comparative examples 3 & 4, 10 wt % LDPE (Melt point 109 C., enthalpy of fusion 122 J/g) was also added.

The abbreviations in Table 1 are: Comp=Comparative Example; EX=Example, PE=polyethylene, GR=graft, EAO=ethylene α-olefin copolymer, and PAO=propylene α-olefin copolymer. Various PEs, GRs, EAOs, and PAOs are further defined in Tables 2A and 2B. The lower case "m" denotes the EAO being synthesized by a metallocene catalysis, the prefix ZN indicates that the EAO being produced by Ziegler-Natta process, and all these EAOs are commercially available (from Dow Chemical Company).

In Table 1, Examples 1-20 and Comparative examples 1-14, with the exception of Comparative example 5, were prepared by melt blending in a 28 mm Werner & Pfleiderer twin screw extruder. Comparative example 5 was 100% BYNEL® 41E687, which is a maleic anhydride modified LLDPE-based adhesive with melt index of 1.7, density of 0.91 g/cc and a melt point of 119° C.

The compositions of the examples and comparative examples are shown in Table 1 below together with the peel strength performance.

Also in Table 1, Component A was an ethylene-based polymer of copolymer. The melt points of Component A ranged between 115° C. to 134° C. having an enthalpies of fusion between 112 to 152 J/g.

Table 1 shows that when a compositions felt within the inventive scope, adhesion to PP and EVOH was superior to the adhesion of a compositions fallen outside of the scope. For instance, although comparative examples 1 and 2 appeared to have high peel strengths, the closest example, in terms of comparable anhydride level and composition, apart from component B, is example 6 where peel strength was even higher still. Similarly, comparative examples 6 and 7 could be compared to examples 13 and 14 in that they had comparable anhydride level and composition, apart from component B. Comparative example 10 had a similar composition to examples 3 and 4, except that the level of component B in comparative example 10 was below the inventive scope. Similar comparative sets can be seen with Comparative example 11 with examples 6 and 7; comparative example 12 with examples 8 and 9; comparative example 13 with examples 10 and 11; and comparative example 14 vs examples 13 and 14.

The application further discloses in greater detail the components of the adhesive compositions in Tables 2A and 2B. The abbreviations in these tables are the same as those disclosed in Table 1.

The DSC method is a thermal method using differential scanning calorimetry and is described in ASTM D3418. The melt points and enthalpies of fusion were measured during the second thermal cycle. The molar composition of the ethylene α-olefin was measured by nuclear magnetic resonance spectroscopy (NMR) using carbon 13. Here, polymer weighed at approximately 180 to 300 mg in a 10 mm NMR tube was mixed with solution of 60 mg of chromium (III) acetylacetonate in 3.5 ml of tetrachloroethane-d2 (tce-d2).

The tube was intermittently heated with a heat gun and vortexed for ~5 minutes to fully dissolve, then immediately placed in the spectrometer magnet at 120° C. to equilibrate. 13C NMR data was acquired at 120° C. on a 500 MHz Agilent INOVA® Spectrometer equipped with a 10 mm broadband probe, using inverse gated decoupling to suppress the Nuclear Overhauser Effect (NOE). Scans, between 4096 to 6144 in number, were collected with a delay of 10 seconds, a spectral width of 31.4 kHz, and an acquisition time of 1.043 seconds. 13C spectra were referenced to tce-d2 at 74.2 ppm.

TABLE 2A

| COMPONENT A | Mole % Comonomer | Melt Point, ° C. | Enthalpy of Fusion J/g (Second heat) |
|---|---|---|---|
| PE1 | 3.4 | 122 | 118 |
| PE2 | 3.9 | 122 | 110 |
| PE3 | 3.8 | 118 | 120 |
| PE4 | 2.9 | 121 | 137 |
| LDPE | 0 | 106 | 110 |
| GR1 | 0 | 131 | 200 |
| GR2 | 3.1 | 117 | 114 |

TABLE 2B

| COMPONENT B | Mole % Comonomer | Melt Point, ° C. | Enthalpy of Fusion J/g (Second heat) |
|---|---|---|---|
| ZN EAO 1 | 12.8 | 114 | 48 |
| m-EAO 1 | 13.4 | 64 | 47 |
| m-EAO 2 | 9 | 86 | 63 |
| m-EAO 3 | 21 | 46 | 46 |
| m-EAO 4 | 10.4 | 123 | 64 |
| m-EAO 5 | 14.4 | 122 | 22 |
| m-EAO 6 | 12.7 | 120 | 56 |
| m-EAO 7 | 14.4 | 122 | 22 |
| m-PAO 8 | 13.7 | 79 | 42 |
| m-PAO 9 | 17 | 143, 45 | 14 |
| m-PAO 10 | 15.6 | 77 | 34 |
| m-PAO 11 | 12.2 | 61 | 31 |
| m-PAO 12 | 22.2 | 110 | 5 |

Examples 21-23

In these examples, a 9-layer blown film of 125 μm thickness was produced with the following configuration where "/" denotes "between layers" and the percentages represent the thickness of individual layers, based on the total thickness of the multilayer.

HomoPP/CoPP/Tie/Nylon6/EVOH/Nylon6/Tie/LLDPE/mPE with the layer distribution of 15%/8%/8%/15%/8%/15%/8%/8%/15%

The homoPP had 3.5 melt flow rate with 0.90 g/cc density, the coPP had 1.9 melt flow rate with 0.90 g/cc density. The LLDPE was a butene LLDPE with 1 melt index and 0.918 g/cc density. The mPE was an octene PE with 1 melt index and 0.902 g/cc density. Nylon 6 was AEGIS® H135QP from Honeywell, and the EVOH was EVAL® F171B from Kuraray America.

The materials for each layer were extruded in a separate extruder, with the two extruders feeding the outer two layers being 2-inch extruders, and the remaining 7 extruders 1.75 inches. All layers fed into a Macro™ die to form a nine-layer coextruded blown film so described.

The tie layer between the polypropylene and nylon layers consisted of the examples is cited in Table 3. The tie layer between the polyethylene and nylon layers consisted of the example adhesive dry-blended at 40 wt % adhesive and 60 wt % 2 MI butene LLDPE of 0.918 g/cc density.

TABLE 3

| | | | Component A | | | | | Component B | | M Maleic anhydride | Peel |
| | | | Ethylene Polymer | | Grafted Ethylene Polymer | | On 100% Basis | | Comonomer | (% of A + B) | Strength |
| Example | Film side | Adhesive | Resin | Wt % | Resin | Wt % | J/g | Mole % | Polymer B | mole % | Wt % | (nominal) | g/25 mm |
|---|---|---|---|---|---|---|---|---|---|---|---|---|---|
| EX21 | PP/tie/PA | EX21 | PE1 | 57 | GR2 | 20 | 125 | 3.3 | m-PAO 12 | 22.2 | 23 | 0.19 | 1378 ± 152 |
| | PE/tie/PA | 40% EX21 + 60% 2 MI butane 0.918 g/cc LLDPE | | | | | | | | | | 0.08 | 1180 ± 55 |
| EX22 | PP/tie/PA | EX22 | PE1 | 57 | GR2 | 20 | 125 | 3.3 | m-EAO4 | 10.4 | 23 | 0.19 | 919 ± 75 |
| | PE/tie/PA | 40% EX22 + 60% 2 MI butane 0.918 g/cc LLDPE | | | | | | | | | | 0.08 | 1069 ± 263 |
| EX23 | PP/tie/PA | EX23 | PE1 | 60 | GR1 | 15 | 134 | 2.7 | m-PAO 12 | 22.2 | 25 | 0.14 | 1659 ± 197 |
| EX21 | PE/tie/PA | 40% EX23 + 60% 2 MI Octane 0.918 g/cc LLDPE | | | | | | | | | | 0.06 | 1075 ± 35 |

Examples 21 through 23 in Table 3 were melt blended together in the same manner as described for examples 1 through 20. The multilayer films so prepared were evaluated for peel strength in the same manner as previously described.

The Examples in Table 3 show that the adhesive compositions in the structure provide excellent adhesion between both PP layers and PE layers to nylon 6 layer. Peel strengths were high, with failure mostly occurring with elongation of the pull strips indicating that peel strength may be comparable to higher than the tensile strength of the testing arms of the strips.

Examples 24-30

Table 4 shows examples of a 5-layer cast film of 50 μm thickness was produced on a three-extruder Egan extrusion coater. The film had the following configuration:
HomoPP/tie/PA6/tie/HomoPP
with the layer gauges at a nominal 25 μm s/2.5 μm/5 μm/2.5 μm/15 μm respectively.

TABLE 4

| | Component A | | | | | | Component B | | M Maleic anhydride | Peel |
| | Ethylene Polymer | | Grafted Ethylene Polymer | | On 100% Basis | | Comonomer | | (% of A + B) | Strength |
| Example | Resin | Wt % | Resin | Wt % | J/g | Mole % | Polymer B | mole % | Wt % | (nominal) | g/25 mm |
|---|---|---|---|---|---|---|---|---|---|---|---|
| Comp 15 | | | | | 100% BYNEL ® 42E703 (Control) | | | | | | 426215 ± 20 |
| EX24 | PE4 | 65 | GR1 | 15 | 150 | 2.4 | m-EAO 7 | 14.4 | 20 | 0.14 | 1127 ± 118 |

TABLE 4-continued

| | Component A | | | | Component B | | M Maleic anhydride | Peel |
| | Ethylene Polymer | Grafted Ethylene Polymer | On 100% Basis | | | Comonomer | (% of A + B) | Stength |
| Example | Resin | Wt % | Resin | Wt % | J/g | Mole % | Polymer B | mole % | Wt % | (nominal) | g/25 mm |
|---|---|---|---|---|---|---|---|---|---|---|---|
| EX25 | PE4 | 65 | GR2 | 15 | 142 | 2.9 | m-PAO 8 | 13.7 | 20 | 0.14 | 1086 ± 78 |
| EX26 | PE4 | 60 | GR2 | 15 | 154 | 2.8 | m-PAO 8 | 13.7 | 25 | 0.14 | 1341 ± 127 |
| EX27 | PE4 | 60 | GR2 | 15 | 154 | 2.8 | m-PAO 9 | 17 | 25 | 0.14 | 1118 ± 62 |
| EX28 | PE4 | 60 | GR2 | 15 | 154 | 2.8 | m-PAO 12 | 22.2 | 25 | 0.14 | 1509 ± 215 |
| EX29 | PE4 | 60 | GR1 | 15 | 131 | 2.8 | m-PAO 12 | 22.2 | 25 | 0.14 | 974 ± 556 |

The homoPP layers were high melt strength homopolypropylene with melt flow rate of 22 and density of 0.9 g/cc blended with 30 wt % homoPP with melt flow of 3.5 and a density of 0.90 g/cc. The nylon 6 was Aegis H35NP from Honeywell. The homoPP was fed into a 4.5 inch extruder, the tie into a 2.5 inch extruder and the nylon into a 2.5 inch extruder. Both the PP and the tie melt streams were split into two so that both layers were disposed on each side of the nylon layer. The melt curtain was coated onto 30# Kraft paper, with an intervening slip sheet of 48 gauge oriented polyester in order to obtain cast film samples for testing. The air gap was set at 4.5 inches, and line speed was 800 feet per minute.

The cast films so obtained were evaluated for peel strength in the same manner as described earlier.

Examples 24 through 30 were melt-blended on a twin screw similar to the other compositions described before. Comparative example 15 is BYNEL® 42E703, a low density-based adhesive with 6.4 melt index, density of 0 91 g/cc and a melt point of 105° C.

Table 4 shows that comparative example 15 had very poor adhesion to PP in contrast to examples 24 to 30.

The invention claimed is:

1. A multilayer structure comprising, or produced from, a polyolefin layer, an adhesive layer, a barrier layer, and, optionally, an additional layer, wherein:
    the adhesive layer comprises or is produced from a composition comprising (1) a first ethylene α-olefin copolymer, (2) a modified first ethylene α-olefin copolymer, and (3) a second ethylene α-olefin copolymer or a propylene α-olefin copolymer;
    the total weight of the first ethylene α-olefin copolymer and the modified first ethylene α-olefin copolymer is from about 65 to about 85%, based on the total weight of the composition;
    the modified first ethylene α-olefin copolymer is a base ethylene α-olefin copolymer that has been grafted with a dicarboxylic acid, an anhydride of the dicarboxylic acid, or combinations thereof;
    the first ethylene α-olefin copolymer contains ≤5 mole % of α-olefin, has a DSC melting point ≥115° C., and has an enthalpy of fusion, as measured by DSC in the second heat, ≥100 J/g; and
    the second ethylene α-olefin copolymer or propylene α-olefin copolymer can be present in the composition from about 15 wt % to about 35 wt %, based on the total weight of the composition.

2. The multilayer structure of claim 1 wherein the adhesive layer is in direct contact with the polyolefin layer and the barrier layer; and
    the modified first ethylene α-olefin copolymer contains 0.03 to 3 weight %, based on the graft concentration in the composition, of a dicarboxylic acid moiety or an anhydride moiety of the dicarboxylic acid.

3. The multilayer structure of claim 1 wherein the base ethylene α-olefin copolymer is different from the first ethylene α-olefin copolymer.

4. The multilayer structure of claim 1 wherein
    the second ethylene α-olefin copolymer contains ≥8 mole % of a $C_4$ to $C_8$ even numbered α-olefin, has a DSC melting point of 115° C. or higher, and has an enthalpy of fusion, as measured by DSC in the second heat, of 80 j/g or lower; or
    the propylene α-olefin copolymer contains ≥8 mole % of one or more $C_2$ to $C_8$ even-numbered α-olefin and has an enthalpy of fusion, as measured by DSC in the second heat, of 80 J/g or lower.

5. The multilayer structure of claim 2 further comprising a tie layer disposed on a side of the barrier layer opposite to the adhesive layer, wherein the tie layer is the same as, or different from, the adhesive layer.

6. The multilayer structure of claim 5 wherein the tie layer is the same as the adhesive layer.

7. The multilayer structure of claim 5 further comprising a second polyolefin layer in contact with the tie layer and opposite to the barrier layer.

8. The multilayer structure of claim 1 wherein the barrier layer comprises a plurality of barrier layers selected from the group consisting of one or more polyamide layers, one or more EVOH layers, and combinations thereof.

9. The multilayer structure of claim 1 having one or more of the following structures
    PP/tie/barrier layer(s)/tie/PE
    PA/tie/PP/tie/barrier layer(s)/tie/PE/PE/EVA or ionomer
    HomoPP/coPP/tie/PE/tie/barrier(s)/tie/PE/PE/mPE
    HomoPP/coPP/tie/PA/EVOH/PA/tie/LLDPE/VLDPE;
    HomoPP/coPP/tie/PE/tie/PA/EVOH/PA/tie/PE/PE/PE/mPE;
    PA/tie/coPP/tie/PA/tie/EVA/EVA;
    PA/tie/coPP/coPP/tie/PA/EVOH/PA/tie/ethylene acid copolymer/ethylene ionomer;
    coPP/tie/EVOH/tie/mPE;
    HomoPP/coPP/tie/PA/EVOH/PA/tie/ethylene ionomer/ethylene acid copolymer; and
    PET/EMA/coPP/tie/PA/EVOH/PA/tie/ethylene ionomer/ethylene ionomer;
    wherein the "/" denotes between layers, "Homo" means homopolymer, "PP" is polypropylene layer, "coPP" denotes layer of copolymer of propylene and α-olefin, "PA" is a polyamide layer, "EVOH" is ethylene vinyl alcohol layer, "LLDPE" is a linear low density polyethylene layer, "VLDPE" is a very low density polyethylene layer, "tie" is a tie layer and wherein at least one tie layer is the adhesive layer, "EVA" is an ethylene vinyl acetate copolymer layer, "mPE" is a layer of polyethylene produced by metallocene catalysis, "PET" is a polyethylene terephthalate layer, and "EMA is an ethylene methacrylate copolymer layer.

10. A process of manufacturing the multilayer structure of claim 1, the process comprising coextruding the polyolefin layer, the adhesive layer, the barrier layer, and optionally, the additional layer under a condition effective to produce a blown film; quenching the blown film in less than about 12 seconds to produce a quenched film; collapsing the quenched film to a flat tubular film; optionally, slitting the flat tubular film to produce a slit flat film; and collecting the slit flat film or the flat tubular film to produce the multilayer structure wherein
the adhesive layer is in direct contact with the polyolefin layer and the barrier layer.

11. A process of manufacturing the multilayer structure of claim 1, the process comprising coextruding the polyolefin layer, the adhesive layer, the barrier layer, and optionally, the additional layer through a flat die to produce a cast film; quenching the cast film on a chilled casting roll to produce a quenched film optionally, slitting the quenched film to produce a slit film; and collecting the quenched film or the slit film to produce the multilayer structure, wherein:
the adhesive layer is in direct contact with the polyolefin layer and the barrier layer.

12. A process of manufacturing the multilayer structure of claim 1, the process comprising coextruding the polyolefin layer, the adhesive layer, the barrier layer, and optionally, the additional layer under a condition effective to produce a coextruded tubular multilayer structure; cooling the coextruded tubular multilayer structure in a first bubble; orienting the coextruded tubular multilayer structure under heating in a second bubble to produce an oriented tubular multilayer structure; and relaxing the oriented tubular multilayer structure under heating in a third bubble to produce the multilayer structure wherein
the adhesive layer is in direct contact with the polyolefin layer and the barrier layer.

13. A process of manufacturing the multilayer structure of claim 1, the process comprising coextruding the polyolefin layer, the adhesive layer, the barrier layer, and optionally, the additional layer through a flat die to produce a cast film or sheet; quenching the cast film or sheet on a chilled casting roll to produce a quenched film or sheet; heating the quenched film or sheet from about 60° C. to about 100° C. to produce a heated film or sheet; stretching the heated film or sheet to produce an oriented film or sheet; optionally, slitting the oriented film or sheet to produce a slit film; and collecting the oriented film or sheet or the slit film or sheet to produce the multilayer structure, wherein
the adhesive layer is in direct contact with the polyolefin layer and the barrier layer.

14. A composition comprising or produced from (1) a first ethylene α-olefin copolymer, (2) a modified first ethylene α-olefin copolymer, and (3) a second ethylene α-olefin copolymer or a propylene α-olefin copolymer; wherein:
the total weight of the first ethylene α-olefin copolymer and the modified first ethylene α-olefin copolymer is from about 65 to about 85%, based on the total weight of the composition;
the modified first ethylene α-olefin copolymer is a base ethylene α-olefin copolymer that has been grafted with a dicarboxylic acid, an anhydride of the dicarboxylic acid, or combinations thereof;
the first ethylene α-olefin copolymer contains ≤5 mole % of α-olefin, has a DSC melting point ≥115° C., and has an enthalpy of fusion, as measured by DSC in the second heat, ≥100 J/g; and
the second ethylene α-olefin copolymer or propylene α-olefin copolymer can be present in the composition from about 15 wt % to about 35 wt %, based on the total weight of the composition.

15. The composition of claim 14, wherein the base ethylene α-olefin copolymer is different from the first ethylene α-olefin copolymer.

16. The composition of claim 14, wherein:
the second ethylene α-olefin copolymer contains ≥8 mole % of a $C_4$ to $C_8$ even numbered α-olefin, has a DSC melting point of 115° C. or higher, and has an enthalpy of fusion, as measured by DSC in the second heat, of 80 J/g or lower; or
the propylene α-olefin copolymer contains ≥8 mole % of one or more $C_2$ to $C_8$ even-numbered α-olefin and has an enthalpy of fusion, as measured by DSC in the second heat, of 80 J/g or lower.

* * * * *